Nov. 3, 1959     I. ORTEGA     2,911,026

RESILIENT NON-PNEUMATIC SAFETY WHEELS

Filed Oct. 23, 1958

INVENTOR.
ISIDORO ORTEGA
BY Henry J. F. Metzler
ATTORNEY.

United States Patent Office 2,911,026
Patented Nov. 3, 1959

2,911,026

RESILIENT NON-PNEUMATIC SAFETY WHEELS

Isidoro Ortega, New York, N.Y.

Application October 23, 1958, Serial No. 769,151

3 Claims. (Cl. 152—153)

The present invention relates to improvements in wheels and in resilient tires for automobiles, bicycles, or other vehicles; and has relation more particularly to a device of this general character of a tubular tire type.

One object of the present invention is the provision of a device of the character described which contains a cushioning medium coacting with the body of the wheel and the felly thereof to absorb undue shocks that may be imposed upon the wheel.

Another object of the present invention is the provision of a device of the character described which instead of being provided with the customary pneumatic inner tube, has a resilient tubular member, and in which the customary pneumatic rubber tire or outer tube is replaced by an outer tubular resilient member of metal, or plastic material or the like, so that the wheel and its tread surface, or tire, will not be exposed to the dangers and annoyances of blow-outs, air leakage, the becoming hard and/or brittle of natural or synthetic rubber due to the effects of heat or long usage.

A further object of the present invention is the provision of a device of the character described which has self-cooling features, so that it will be air-cooled automatically while rolling along a road, thus being specifically well adapted for being used on automobiles, omnibuses, large-distance trucks, and other vehicles traveling at great velocities on modern high-speed roads.

Yet still another object of the present invention is the provision of a device of the character described which greatly reduces tire noises, which has a safe gripping surface as well as a pleasing outer appearance, and which is simple in construction, efficient in operation, inexpensive to manufacture, and the resilient action of which will greatly increase the comfort of persons riding in a vehicle equipped with my new and improved wheels.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

In said drawing.

Similar reference characters refer to similar parts throughout the several views.

Figure 1:
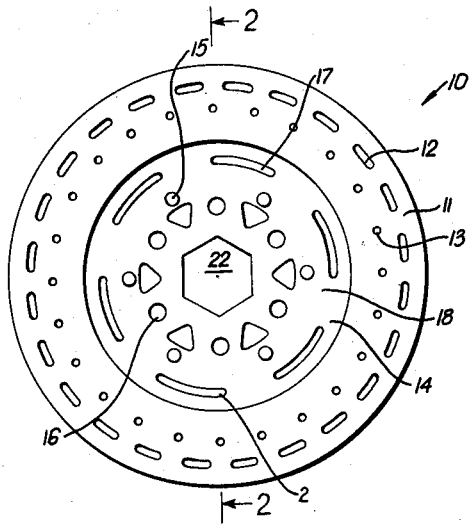
Figure 1 is a plan view of a preferred embodiment of my invention.

In the drawing (Fig. 2) the numeral 1 denotes a brake drum with wheel bolts 2, which has a protruding hexagon hub portion 3. These parts are shown in dotted lines to indicate that they do not form part of my present invention.

My new and improved wheel has three main parts, which are an outer tubular member 11, an inner tubular member 19 and a disk wheel member 14. The outer tubular member 11 preferably is shaped substantially like an outer tube of an ordinary pneumatic tire, so that my wheel has substantially the same outer appearance as customary wheels, and a circular wall portion of the member 11 may be colored white, so as to give it the appearance of a white-wall tire. However, the member 11 is not made of rubber but of plastic material, aluminum, or any other metal such as steel or the like, which has a sufficient degree of resiliency. I prefer to provide the member 11 with a plurality of perforations, which may be formed as slots 12 or as holes 13 arranged in circular rows, so as to increase the pliability and to permit ventilation and air cooling at high speeds.

The inner tubular member 19 is of the same or a similar material as the member 11, but it has thinner wall portions than the member 11. Like the outer member 11, the inner member 19 is not shaped as a complete circle in cross-section, but as a horse shoe or a circular shell member having a pair of parallel circular edge portions 4, which are in spaced relation to each other, as may be seen in Figs. 2 and 3. Between the edge portions 4 of the member 19 and similar edge portions 5 of the member 11 there are interposed ring members 21, which preferably are U-shaped in cross-section, having flange portions which are secured to the edge portions 4 and 5 respectively. The inner tube 19 also is provided with perforations, which may be shaped as slots 20, so as to allow air to pass therethrough during operation, and to aid in cooling the wheel at high velocities.

The wheel 14, which preferably consists of a pair of disks joined to each other by rivets 15, has outer rim portions 7 provided with longitudinal ventilation openings 17, and additional ventilation openings 16 and 18 are provided in the wheel disks closer to the center of same. A hexagon central opening 22 in the wheel 14 is adapted to fit around the hexagon hub portion 3 of the brakedrum 1. The bolts 2 of the brakedrum 1 can be extended through corresponding holes 16 in the wheel 14, so that my new and improved resilient non-pneumatic safety wheels can be attached to ordinary brake drums in the manner customary with ordinary wheels.

Figure 2:
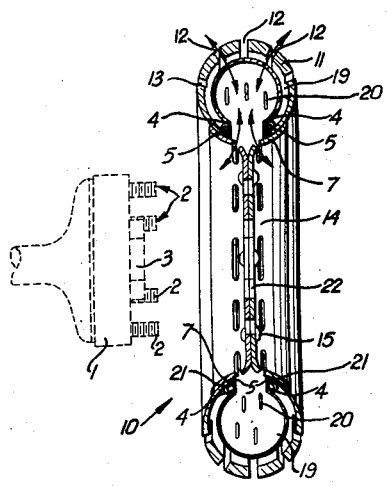
Fig. 2 is a sectional view of an entire wheel and tire member on the line 2—2 of Fig. 1.
Figure 3:
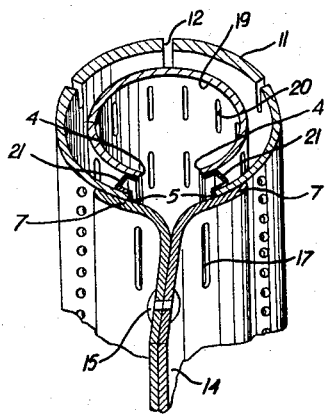
Fig. 3 is a fractional enlarged sectional view similar to that of Fig. 2.
Figure 4:
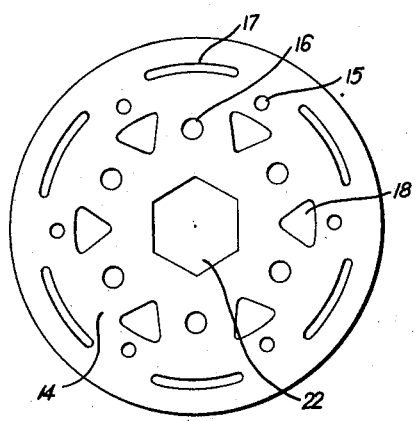
Fig. 4 is an enlarged detailed plan view of a wheel body without tire member.

As indicated by arrows in Fig. 2, the air passes through the perforations 17, 20 and 12, so as to cool the rim portions 7, and the tubular members 11 and 19 at high speed driving. The perforations 12 also increase the gripping action of the wheel, so that there will be a reliable acceleration and brake action on wet and/or slippery surfaces.

The resiliency of the members 11 and 19 is such that normal shocks will be absorbed by the outer member 11 alone, but that very powerful shocks will temporarily deform the member 11 to such an extent that its inner side presses upon the member 19, causing a yielding of the same, like a cushioning medium, in a manner similar to so-called "helper springs" which are deformed only after the normal springs of a vehicle have yielded to a predetermined extent under an increased load.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A resilient non-pneumatic safety wheel comprising a wheel body having a perforated concave rim portion, an outer tubular member having resilient perforated wall portions and engaging the rim portion of said wheel body and being formed in cross section as a circular shell having circular edge portions in spaced relation to each other, a perforated inner tubular member mounted within said outer tubular member and being in spaced relation thereto and being shaped in cross section as a circular shell having circular edge portions, and spacing members connecting the circular edge portions of said inner tubular member to the circular edge portions of said outer tubular member, said tubular members having different degrees of resiliency.

2. A resilient non-pneumatic safety wheel comprising a wheel body having a concave rim portion, an outer circular resilient member being substantially horse-shoe-shaped in cross-section and having circular edge portions which are in spaced relation to each other and engage the rim portion of said wheel body, a resilient inner circular member shaped in cross-section like said outer circular member and being contained therein and having circular edge portions which are in spaced relation to each other and to the circular edge portions of said outer circular member, and ring members interposed between the circular edge portions of said outer circular member and the circular edge portions of said inner circular member.

3. A device of the character described comprising a wheel body having a rim portion, an outer circular resilient member of substantially horse-shoe-shaped cross-sectional formation having circular edge portions which are in spaced relation to each other and engage the rim portion of said wheel body, a resilient inner circular member of a cross-sectional formation as said outer circular member and being smaller than the same and contained therein and having circular edge portions which are in spaced relation to each other and to the circular edge portions of said outer circular member, and ring members of U-shaped cross-sectional formation having web portions and flange portions and being interposed between, and with their flange portions connected to, the edge portions of said circular members, so as to fasten the inner circular member to the outer circular member and to keep them in spaced relation to each other.

References Cited in the file of this patent

UNITED STATES PATENTS

| 1,311,340 | Freel | July 29, 1919 |
| 1,342,339 | Martin | June 1, 1920 |
| 1,588,008 | Burdette | June 8, 1921 |